United States Patent [19]
Reeves et al.

[11] 3,720,845
[45] March 13, 1973

[54] LIMIT SWITCH WITH HIGH HYSTERESIS

[75] Inventors: John R. Reeves, Trafford, Pa.; Bruce R. Dow, Altamonte Springs, Fla.; Francis T. Thompson, Murrysville, Pa.

[73] Assignee: Westinghouse Electric Corporation, Pittsburgh, Pa.

[22] Filed: June 7, 1971

[21] Appl. No.: 150,575

[52] U.S. Cl. ............................. 307/116, 317/DIG. 2
[51] Int. Cl. ............................................. H01h 36/00
[58] Field of Search ..307/116; 317/DIG. 2; 340/266; 324/144

[56] References Cited

UNITED STATES PATENTS

| 2,886,754 | 5/1959 | Ehret | 317/DIG. 2 |
| 3,207,917 | 9/1965 | Martin | 317/DIG. 2 |
| 3,161,387 | 12/1964 | Jutier | 317/DIG. 2 |

Primary Examiner—Herman J. Hohauser
Assistant Examiner—William J. Smith
Attorney—A. T. Stratton and C. L. McHale

[57] ABSTRACT

A limit switch means including a magnetic transducer comprising a stator and rotor which supplies electrical energy to an associated comparator circuit. The output of the comparator circuit is connected to the gate of a silicon controlled rectifier and a voltage boosting device. The magnetic transducer is sensitive to changes in angular position of the rotor which is coupled mechanically to an associated cam, lever or similar component. When the relative position of the associated component is changed, the rotor is moved to such a position as to cause the voltage comparator circuit to supply a signal to the silicon controlled rectifier's gate sufficient to energize or turn on the silicon controlled rectifier. This allows current to flow through one or more circuits to which the silicon controlled rectifier is connected. In addition, where desired transformer coupling may be provided to drive or control other circuits whose functions may be complementary to that of the circuit which is primarily controlled. A voltage boosting means responds to the turning on of the silicon controlled rectifier in such a manner as to create a hysteresis effect by making use of an increase in the voltage at the gate of the silicon controlled rectifier so that the rotor of the associated magnetic transducer must move a substantial amount in the opposite direction to deenergize the silicon controlled rectifier and consequently change the operating condition of any circuits which it controls.

23 Claims, 12 Drawing Figures

FIG. I

LIMIT SWITCH WITH HIGH HYSTERESIS

BACKGROUND OF THE INVENTION

This invention relates to limit switches and it has particular relation to solid state limit switches which are adapted to cooperate with electromagnetic transducers.

In certain types of electrical apparatus such as variable reluctance magnetic circuits of the type disclosed in U.S. Pat. Nos. 3,152,311, 3,394,363, and 3,517,362, rotating members are actuated to move so as to alter or change flux paths in stationary magnetic members of a transducer. The variations in flux paths are the means whereby the changes in position or movements of the movable rotating member are sensed.

In other types of electrical apparatus, static control devices, such as silicon controlled rectifiers, form part of electrical circuits of the type disclosed in U.S. Pat. No. 3,493,838 where a capacitive device or some similar element is used to control the gate of a silicon controlled rectifier.

Magnetic transducers of the type previously described present a number of problems, one of which is lower sensitivity, that is, the ability to detect or respond to very small changes in rotational position of the rotating member provided. Another problem is flux crowding, whereby the number of magnetic lines of flux per unit area of magnetic section varies during the normal operation of the magnetic transducer. This can happen in a number of ways, the first of which is shown in previously mentioned U.S. Pat. No. 3,517,362 in which J. A. Mead discloses a magnetic transducer in which the number of flux lines varies through a given cross-section as the rotary member turns. In U.S. Pat. No. 3,152,311, N. N. Bojarski also discloses a magnetic transducer in which the cross-sectional area varies as the rotating member turns. In either case, the number of magnetic flux lines per unit area or flux density varies as the rotating member of the magnetic transducer operates. This causes proportional increases and decreases in undesirable heat dissipation and eddy currents in the magnetic material from which certain parts of the transducer are formed. In addition, the construction of known magnetic transducers of the type described is not maximized by providing for shapes of the parts of the magnetic structure which are arranged or constructed to accommodate a predetermined magnetic flux density.

In U.S. Pat. No. 3,493,838 by L. Gyugyi et al., a capacitive storage means is used in conjunction with the gate of a silicon controlled rectifier with the capacitive element operating to trigger the silicon controlled rectifier rather than to maintain it in its energized state.

SUMMARY OF THE INVENTION

In accordance with the invention, a generally rectangular shaped magnetic stator, which may be laminated, has four generally equally spaced inwardly facing poles. The first of these poles is surrounded by a bobbin on which is disposed a winding or coil having a plurality of turns of a coiled wire or conductor, the ends of which are adapted to be connected to a source of alternating current. The coil or winding is disposed in inductive relation with the adjacent pole piece, to produce magnetic flux when energized. Adjacent to this primary pole and on either side of it is a pair of oppositely disposed poles. These latter poles have similar bobbins surrounding them with each bobbin having disposed thereon a coil or winding having a plurality of turns of electrically conducting wire. Disposed along the inner periphery of the stationary magnetic structure is a fourth stationary pole which has no winding disposed thereon. All four magnetic poles have concave surfaces such that a generally circular movable magnetic member or rotor may rotate in close proximity to all four stationary poles. The generally circular rotor has two complementary or opposite convex surfaces or poles which conform closely to the shape of the previously mentioned stationary poles thus minimizing the air gaps between the rotor and the associated poles. The first convex curved or arcuate surface on the rotor is normally aligned adjacent to the previously mentioned primary stationary pole and is slightly larger in a circumferential sense than said pole so that the curved surface of the rotor may rotate within a predetermined range or sector and still present substantially the same surface area to the primary or excitation pole. Oppositely disposed on the centrally pivotable rotor is an even larger pole portion having a radius which allows it to rotate among the two other oppositely disposed poles having windings thereon and the pole which has no electrical winding disposed thereon. The periphery of the latter pole portion of the rotor is large enough that it presents a continuous surface to the stationary pole without any winding and part of said pole is disposed adjacent to the other two adjacent poles during a normal operating condition. Consequently, flux produced in the primary stationary pole due to the magnetomotive force of the associated winding when energized passes through the rotor to the oppositely disposed stationary pole whereupon the magnetic flux lines split and divide substantially equally around the remaining sides of the generally rectangularly shaped stationary magnetic structure or stator. In addition, a small amount of magnetic flux is shunted through the first and second adjacent stationary poles and through the remainder of the stationary magnetic structure, with all branches of magnetic flux returning to the primary stationary pole. The small amounts of leakage flux which flow through the adjacent oppositely disposed stationary poles are inductively coupled to a sensitive output electrical circuit in each case. It should be noted that in the magnetic circuits of the rotor or stator, the relative magnetic flux per unit area does not change substantially; consequently, the entire transducer may be designed to accommodate a specific or predetermined magnetic flux. It should also be noted that the pole portion on the rotor which overlaps the stationary pole which does not have a winding disposed thereon and the pair of adjacent stationary poles only slightly shades or overlaps the latter poles so that if the rotor is moved or rotated only slightly, the total amount of magnetic flux flowing through each of the respective oppositely disposed pair of stationary poles changes substantially in terms of percentage, although the magnetic flux per unit area or flux density in each of said poles does not change appreciably. Consequently, a rotation of the rotor of only a few degrees may double or even triple the output current in one of the inductively coupled output windings, whereas it would correspondingly reduce by half or reduce by a factor of 3 the current in the other oppositely disposed output winding. This indicates the sensitivity of the magnetic transducer. Since the rotor may be coupled to a lever or cam or some similar device which moves or rotates due to various mechanical functions performed in the vicinity of the cam or lever a slight change in angular position will cause a substantial change in the relative output currents associated with the two adjacent oppositely disposed poles.

The two output currents of the magnetic transducer in turn are applied to a voltage comparator where they are converted to voltage signals, each of which is compared against the other to produce an output voltage signal which is proportional to the difference in voltage which, in turn, is substantially proportional to the angular deviation of the rotor from a central reference position. When the rotor is in its central reference position, the amount of magnetic flux flowing through each of the oppositely disposed output poles is substantially equal; therefore, the induced output currents are substantially equal in magnitude. When applied to the voltage comparator and converted to a voltage signal, the two output currents therefore produce an output potential or voltage which is substantially zero. When the rotor moves away from the central reference position a predetermined number of degrees, the output voltage of the voltage comparator is sufficient to apply a triggering voltage to the gate of an associated silicon controlled rectifier or similar device and turn it on.

Another aspect of the applicants' invention concerns a silicon controlled rectifier with an associated protective capacitor and resistor circuit which is connected to two terminals of a diode bridge network as the middle leg of a diode bridge network. The other two terminals of the diode bridge network (those not connected to the terminals of the silicon controlled rectifier) are connected in series to a source of alternating current and a load which typically constitutes a relay coil. In addition, the relay coil may be shunted by a transformer primary coil or winding. The connections of the bridge network, source of alternating current, and the relay coil or load are arranged so that when the silicon controlled rectifier is energized or conducts, current flows through the relay coil or load thus actuating the relay to perform a predetermined function. Conversely, when the silicon controlled rectifier or similar device is off or deenergized, substantially no current may flow through the previously mentioned relay coil. The gate terminal of the silicon controlled rectifier is connected to the output terminal of the aforementioned voltage comparator and to a voltage boosting circuit which may be either of two types, as will be described later.

Normally, when sufficient positive voltage exists at the output terminal of the voltage comparator network, such as would be the case if the rotor were moved from the central reference position to produce a relatively greater output current in one of the inductively coupled output circuits than in the other inductively coupled output circuit, the silicon controlled rectifier will be turned on and thus conduct current through the associated relay coil. Under normal circumstances, the current being conducted through the relay coil will tend to be bidirectional alternating current having the characteristic shape of a sine wave. Normally, the presence of the previously mentioned triggering voltage at the gate of the silicon controlled rectifier will only turn the rectifier on and as is known, will not substantially affect the operation of the silicon controlled rectifier again until the silicon controlled rectifier has been turned off or actuated to a substantially non-conductive state by other means, such as a reduction in the voltage across the anode and cathode of the silicon controlled rectifier to a value generally below the value of the voltage on the gate of the silicon controlled rectifier. However, in one embodiment of the invention, a capacitor is connected between the gate and the cathode of the silicon controlled rectifier so that once sufficient voltage has been generated in the voltage comparator network to turn the silicon controlled rectifier on, certain operation take place which cause the silicon controlled rectifier to remain on even though that the output voltage of the voltage comparator should decrease to a value which would otherwise turn the silicon controlled rectifier off. This arrangement creates a positive hysteresis effect which allows the disclosed limit switch to be insensitive to slight mechanical vibrations, slight deviations in the source current, slight variations in component tolerances, and extraneous noise voltage pickup.

The operation whereby the silicon controlled rectifier is caused to remain on is as follows: once the silicon controlled rectifier is turned on, anode current flows through a resistance which will be called the anode-to-cathode resistance of the anode-to-cathode circuit. Since the current flowing is substantial, it will create a substantial increase in voltage between the gate and cathode due to the voltage drop across that part of the anode-to-cathode resistance which is also connected between the gate and cathode. Since the previously mentioned capacitor is connected between the gate and cathode, the voltage across it must increase to the same value because the capacitor acts as an energy storage means for current which flows out of the gate of the silicon controlled rectifier due to the increase in gate-to-cathode voltage. Consequently, when the tendency occurs for the silicon controlled rectifier to turn itself off because the current flowing through the previously mentioned anode-to-cathode circuit or resistance decreases, the associated capacitor will return charge to the gate for a short period of time to maintain the silicon controlled rectifier in its on state until the next half cycle of the previously mentioned full wave rectified current appears. Consequently, this capacitive voltage boosting network acts as a holding or sustaining circuit and as a hysteresis creating circuit.

In another embodiment of the invention which may be used at lower temperatures, a solid state transistor is used in conjunction with a feedback means to accomplish the same function as the previously discussed capacitive voltage boosting network.

Finally, as previously mentioned, the relay coil or load of the solid state limit switch may have a transformer primary winding connected across it. The secondary of the same transformer may be connected to a second full wave rectifier circuit with a silicon rectifier and a second external load circuit containing a second relay coil. This switching circuit is electrically coupled to the first switching circuit through the previously mentioned transformer in a complementary manner so that when the first switching circuit or first silicon controlled rectifier is conducting, the second switching circuit is substantially non-conducting and, alternatively, when the first switching circuit is substantially non-conducting, the second switching circuit is conducting. This combination forms a relay system where there is a main set of relay terminals and an auxiliary set of relay terminals which are actuable to opposite conducting states.

DESCRIPTION OF THE PREFERRED EMBODIMENT

Figure 1:
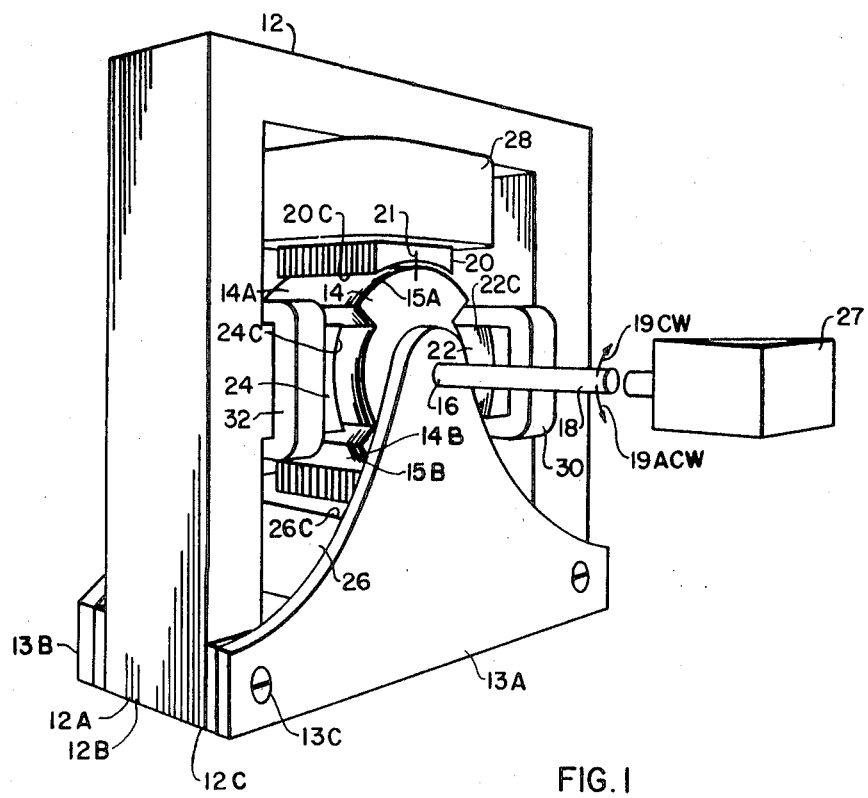
FIG. 1 is a view of the magnetic transducer used in the solid state limit switch.

Referring now to the drawings, and FIG. 1 in particular, the switching member 10 shown therein may comprise a generally rectangularly shaped magnetically conducting stator or stationary support member 12 which may be formed from laminated, metallic soft magnetic material such as indicated at 12A and 12B, and a pair of adjacent preferably non-magnetically conducting rotor supporting means or structures 13A and 13B which may be attached or secured to stator 12 by suitable means such as a plurality of bolts or fastening structures one of which is shown at 13C. Switch 10 also comprises a rotating member or rotor 14 with oppositely disposed magnetic pole sections 14A and 14B. Rotor 14 may be made of a soft magnetic material which may be laminated, such as an alloy of iron or steel, to conduct or provide a low reluctance path for magnetic flux. Poles or pole sections 14A and 14B have outer peripheries or perimeter sections 15A and 15B which are generally convex, curvilinear surfaces. Rotor 14 may be supported on adjacent supporting means or legs 13A and 13B by means of a shaft 18 on which the rotor 14 is mounted and which is free to rotate in the opening 16 provided in supporting means 13A and a similar opening (not shown) in supporting means 13B. Shaft 18 is capable of rotating in direction 19CW or 19ACW to cause rotor 14 to change position angularly within the inner periphery of stator structure 12.

Stator or stationary magnetic structure 12 comprises four internally directed stationary magnetic poles 20, 22, 24 and 26 where poles 20, 22, 24 and 26 may be made of the same material as stator section 12. Each of the poles 20, 22, 24 and 26 has a concave inner periphery or surface as indicated at 20C, 22C, 24C and 26C, respectively, which generally closely corresponds in radius of curvature to the convex pole sections or surfaces 15A and 15B on rotor 14, so that the rotor 14 may move freely among the poles 20, 22, 24, 26 in such a manner that convex surfaces 15A and 15B on rotor 15 may rotate in close proximity to concave surfaces 20C, 22C, 24C and 26C to establish substantially uniform air gaps between mating parts of poles 20, 22, 24 and 26 and rotor poles 14A and 14B. This is not to say that surfaces 15A and 15B need necessarily overlap or become adjacent to all of stator pole surfaces 20C, 22C, 24C and 26C concurrently.

Stator pole 20 will hereinafter be referred to as third pole or main pole of switching section or transducer 10 and serves to conduct magnetic flux from stator section 12 through main or input pole 20 into rotor section 14 with the magnetic flux passing generally through the gap between surfaces 20C and 15A of the respective poles 20 and 14. Also mounted on stator section 12 and disposed approximately 90 degrees away in angular displacement in each direction from main or input pole 20, are oppositely disposed output poles 22 and 24 which will hereinafter be referred to as first and second stator output poles, respectively. Output poles 22 and 24 are adapted to conduct magnetic flux from rotor pole 14B in such a manner that the flux may flow from convex surface 15B through a gap across convex surface 22C or convex surface 24C or both of said surfaces and continue through poles 22 or 24 and around magnetic stator 12 back to the vicinity of input pole 20. It is generally contemplated that rotor 14 may be positioned so that a slight but not necessarily equal overlap or shading of pole 15B by each of poles 24 and 22 is likely. In such a case, magnetic flux may flow as previously described through both poles 24 and 22 from rotor 14. However, should the position of rotor section 14 be changed substantially angularly in either direction 19CW or direction 19ACW by a predetermined angle or number of degrees, it may be possible for only one of the poles 22 or 24 to have a surface (22C or 24C) which overlaps surface 15B of rotor pole 14B so that magnetic flux is conducted through only one of the poles 24 or 22.

Magnetic pole structure or main pole 20 has an input coil or winding 28 mounted there on and disposed in inductive relation with it so that when electric current flows through a plurality of electrically conducting turns which form part of the coil 28, magnetic flux lines are produced or generated in pole 20 which travel or flow through portions of the rotor 14 and stator 12. In addition, poles 22 and 24 have disposed in inductive relation therewith coils or windings 30 and 32, respectively, so that magnetic flux which passes into either or both of poles 22 and 24 may induce first and second electrical currents into either or both of coils 30 and 32, respectively, each of which includes a plurality of electrically conducting turns.

Finally, there is magnetic pole 26 also disposed on the inner periphery of stator structure 12. Magnetic pole structure or pole 26 is disposed generally opposite pole 20 and spaced approximately 90° along the inner surface of the magnetic structure 12 from each of output poles 22 and 24. Pole 26 has no inductive coil surrounding it and merely acts as a conductor of some of the magnetic flux which is generated or produced in magnetic pole 20 and carried through rotor 14. Thus, pole 26 acts to complete the return path for a substantial portion of the previously mentioned magnetic flux through stator section 12.

In general, switch structure or transducer 10 has a reference position 21 in which rotor 14 is substantially aligned with surface 15B of rotor 14 overlapping concave surfaces 22C and 24C by relatively small but substantially equal amounts. When rotor 14 is disposed in the reference position 21, magnetic flux generated or produced in pole 20 as a result of current flowing in coil 28, is conducted through rotor 14 to pole sections 22, 24 and 26 with most of the magnetic flux being conducted into pole section 26 and around the outer periphery of stator 12 back to the pole 20.

Figure 2:
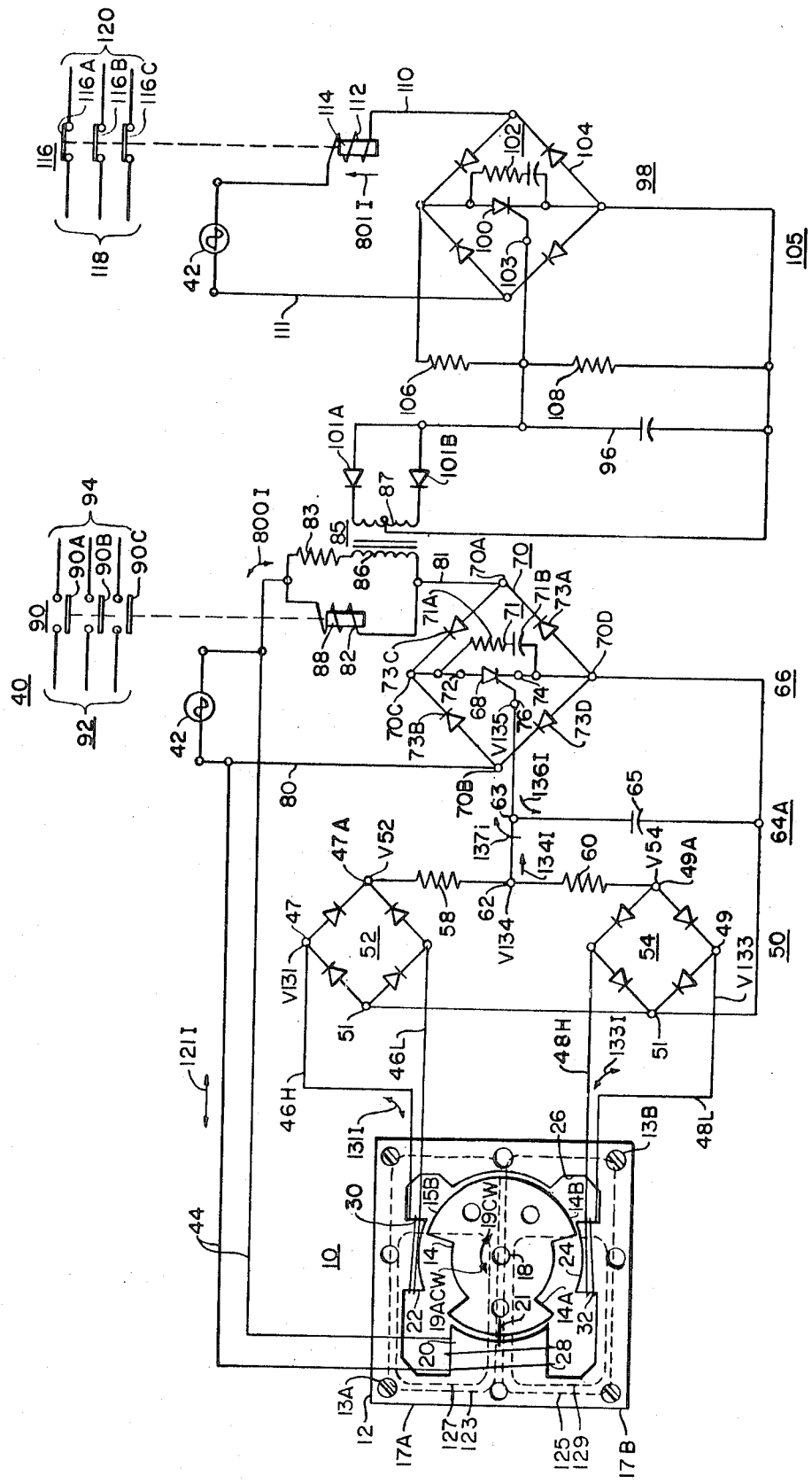
FIG. 2 is a schematic diagram of one embodiment of the solid state limit switch.

Referring now to FIG. 2, the possible paths that magnetic flux may take through stator section 12 are indicated. It should be noted that current 121I flowing in lines 44 to coil 28 generates or produces magnetic flux as indicated by 123, 125, 127 and 129 within magnetic pole or pole section 20. Some magnetic flux then flows into and substantially through rotor 14, as indicated by dotted lines 123 and 125. The flux indicated by the dotted lines 123 and 125 flows completely through rotor 14 to pole 26 whereupon flux indicated by the line 123, flows through the upper part 17A of stator 12 and flux indicated by the line 125, flows through bottom part 17B of stator 12, whereupon said magnetic fluxes join again in the vicinity of pole 20. In addition, magnetic flux lines indicated at 127 may be diverted away through magnetic pole structure 22, the stator section 12 and back into main pole or input pole 20. Similarly, magnetic flux as indicated at line 129 may flow through magnetic pole 24 and through the remainder of stator 12 to rejoin the other previously mentioned flux lines in magnetic pole 20.

As can be seen by close examination of the transducer section 10 in FIG. 2, slight rotation of the rotor 14 in direction 19CW or direction 19ACW will cause more surface area of the rotor 14 at pole 15B to overlap either stationary pole 22 or 24, thus allowing more magnetic flux to flow through one of said poles, such as pole 22, and less flux to flow through the oppositely disposed pole, such as pole 24. Since the more magnetic flux that flows through either pole 22 or pole 24, the more electrical current is generated in the respective coils 30 or 32, the relative magnitudes of corresponding output current 131I, 133I will differ depending on the relative position of rotor 14 with respect to reference line or normal position 21. Consequently, any operation which causes shaft 18 to rotate, such as the movement of part of an associated machine tool which engages a toggle, cam or gear or some similar mechanical means attached to shaft 18 will change the position of rotor 14 and thus change the relative value of output currents 131I and 133I to reflect the change in position of the rotor 14.

It will be seen in FIG. 2 that output currents 131I and 133I from the transducer 10 are applied to bridge networks 52 and 54, respectively. Bridge networks 52 and 54 along with the innerconnected combination of resistors 58 and 60 comprise a voltage comparator network 50. It is noted that the phase of the voltage and current generated in bridge circuit 52 is 180° out of phase with that of the current and voltage generated in or applied to bridge network 54. Consequently, full wave bridge rectifier network 52 supplies voltage or potential V52 to terminal 47A which is positive with respect to potential V54 at terminal 49A of bridge network 54. Both voltages V52 and V54 represent unidirectional pulsating signals which generally do not change polarity. The resistances of resistive elements or resistors 58 and 60 are of generally equal value, such that the voltage V134 at node or junction point 62 reflects the relative absolute difference between voltage V52 and V54. As an example, when rotor 14 is at its neutral or normal reference position 21, the currents 131I and 133I are substantially equal and the corresponding voltages V52 and V54 are substantially equal; consequently, the voltage V134 at junction point 62 with respect to common terminal 51 of the two bridge networks 52 and 54 is approximately zero. Should current 131I increase and current 133I decrease, as would be the case if rotor 14 were moved in the direction 19ACW, then voltage V52 would increase and voltage V54 would decrease resulting in a voltage V134 at junction point 62 which is slightly positive with respect to the common terminal 51 or of the same polarity as voltage V52.

Connected to junction point 62 is a voltage boosting means 64A, more specifically capacitive element 65, and the gate 76 of a silicon controlled rectifier or thyristor or gated static switching means 68. Voltage boosting means 64A which comprises capacitor 65 is connected to junction point 62 at junction point or positive terminal 63 of capacitor 65. Generally, junction point 62, junction 63 and gate 76 have the same potential value during static operation and differ only slightly in voltage value during dynamic operation. The combination of voltage V134 and that portion of the current 134I flowing into gate 76 may be suitable to trigger or turn on silicon controlled rectifier 68 depending upon the relative magnitude and polarity of alternating voltage source 42 as supplied to the silicon controlled rectifier anode 72 and cathode 74 through the full wave bridge rectifier network 70. In any event, the remaining portion of current 134I which does not flow into gate 76 flows into capacitor 65 to charge capacitor 65 so that the voltage at terminal 63 is substantially the same potential as the voltage at terminal 62, namely voltage V134.

Switching circuit 66 comprises gated static switching means 68 and the previously mentioned full wave bridge rectifier network 70. Silicon controlled rectifier 68 comprises an anode 72, a cathode 74, and a control element or gate 76. The anode 72 and cathode 74, respectively, are connected to a source of unidirectional current or pulsating, rectified alternating voltage, as is produced by full wave bridge rectifier network 70 from a source of alternating current 42. When the gate to cathode voltage V135 exceeds the switch on voltage of SCR 68, the SCR conducts. This causes current to flow through line 80 during a positive half-cycle of alternating current voltage from source 42 to bridge diode 73B into bridge terminal 70C and consequently, to anode 72 of silicon controlled rectifier 68. The current then flows through the anode-cathode circuit of silicon controlled rectifier 68 to cathode terminal 74 and to bridge terminal 70D through bridge rectifier or diode 73A and then to lead or wire 81. Load current 800I flowing through lead or line 81 is returned to the source of alternating current 42 through an alternating current type relay coil 82 having associated therewith a movable arm or slug 88.

The flow of a significant portion of current 800I through through relay 82 energizes relay coil 82 to close contact means 90 which may comprise one or more contacts 90A, 90B, 90C as illustrated, so as to connect circuits 92 and 94 to thereby perform a predetermined control function, such as changing the direction of movement of a cutting edge, for example, on a controlled machine tool 27. During the negative half-cycle of the alternating current source 42, current flows in a reverse direction through alternating current coil 82 causing relay contacts 90 to remain closed. The current at this time flows through line 81, bridge rectifier diode 73C, through silicon controlled rectifier 68 in a manner similar to that just described and through bridge circuit diode 73D and to line 80 where the current is returned to the alternating current source 42. As can be seen, alternating (pulsating) current flows through coil 82 energizing it during both positive or negative half-cycles of source 42. However, bridge network 70 permits current to flow in only one direction through silicon controlled rectifier 68. Thus, silicon controlled rectifier 68 will remain in a conducting state provided that no significant negative voltage signal V134 is applied to gate 76. Silicon controlled rectifier or static switching means 68 may be protected by a noise suppression network 71 comprising a resistor 71A and capacitor 71B.

The alternating (pulsating) voltage is also provided to the secondary 87 of transformer 85 through the primary winding 86 of transformer 85. Current is supplied alternately through diodes 101A and 101B to capacitor or second voltage boosting means 96 and gate 103 of thyristor or second silicon controlled rectifier or slaved switching means 100. Biasing resistors 106 and 108 are connected in series between the anode and cathode of the controlled rectifier 100. Slave circuit 105 which includes transformer secondary 87, capacitor 96, silicon controlled rectifier 100, bridging means 104, and second or complementary relay coil 112 acts similarly to the previously described switching circuit 64A, except that the phasing of the voltages across the primary and the secondary windings 86 and 87, respectively of transformer 85 are arranged so that slave circuit 105 may operate in a complementary manner to the circuit which includes switching means 66. That is, when silicon controlled rectifier 68 is conducting, causing coil 82 to be energized by load current 800I, thus closing contacts 90, slave or complementary circuit 105 is deenergized, causing coil 112 to also be deenergized so as to open normally closed contact means 116 which may include three phase contacts 116A, 116B and 116C. The contact means 116 may be disposed to connect circuits 118 and 120 where circuits 118 and 120 may also be arranged to control a function of an associated machine tool. The operation of circuit 105 is similar to that of the previously described switching circuit which includes circuits 50, 64A and 66. In other words, the operation of the silicon controlled rectifier or switch means 100 in combination with the boosting means and voltage comparator circuit, will be the same as that described with respect to the primary switching means 66 of the switch 40 with the understanding that circuit 105 operates essentially in the same manner.

It is desirable that silicon controlled rectifier 68 and the switching means 66 of which it is a component have a hysteresis or off delay operating characteristic. That is, silicon controlled rectifier 68 should be so controlled that once gate 76 has been energized to actuate silicon controlled rectifier 68 to pass current, it should remain energized even under the influence of slight variations in voltage V134. The value of voltage necessary to trigger or turn on silicon controlled rectifier 68 should be substantially or significantly greater than the amount of voltage necessary to deenergize or turn off silicon controlled rectifier 68. As can be seen, slight mechanical rotational variations in shaft 18 or electrical variations in circuits 52, 54 or 64A for example, as well as variations in transducer 10 may cause silicon controlled rectifier 68 to inadvertently turn off or cease to be energized once it has been turned on. Consequently, there is a need for a hysteresis generating circuit which insures positive turn on of silicon controlled rectifier 68 and which provides a dead band of gate voltage in the operation of controlled rectifier 68 to insure that switching circuit 66 will remain on after it has been turned on.

To accomplish this function, it must be realized as will be shown later, that substantial current flowing through the anode-to-cathode circuit (72-to-74) of silicon controlled rectifier 68 causes the gate voltage V135 of silicon controlled rectifier 68 to increase by a small but significant amount once silicon controlled rectifier 68 has been turned on by the action of V134 and current 134I. This increase in voltage represented by voltage V135 is due to the flow of current through a resistance (not shown in FIG. 2) which may be referred to as the gate component of the anode-to-cathode circuit resistance R(A-K). Current flowing through this resistance, R(A-K), causes an increase in voltage across it which is reflected at gate 76 resulting in the voltage represented by V135. This causes a current 136I to flow toward junction point 63 and into voltage boosting means 64 A, as represented in this case by capacitor 65. Consequently, as the pulsating current flowing through silicon controlled rectifier 68 which is supplied from alternating current source 42 and rectified by rectifying means or full wave bridge rectifier 70 nears zero, the tendency for the silicon controlled rectifier 68 to turn off is overcome by an increased gate-to-cathode voltage V135, produced by the prior integration of current 136I by capacitor 65, and the subsequent feedback current 137I therefrom. As the current provided by alternating current source 42 approaches current zero, the voltage V135 begins to decrease in proportion to the anode to cathode current, since voltage V135 is essentially equal to current times the gate component of the anode-to-cathode resistance R(A-K). However, there is sufficient voltage retained across capacitor 65 to maintain terminal 63 at a higher voltage than gate 76, thus tending to keep silicon controlled rectifier 68 turned on. As voltage V135 begins to decrease, current 137I flows into gate 76 from capacitor 65 acting as a positive source of energy to gate 76 which, in turn, actuates silicon controlled rectifier 68 to remain energized until the next current pulse from current or energy source 42 is applied to the bridge rectifier network 70, significantly increasing the current through silicon controlled rectifier 68 to a value which generates a value of voltage which is in excess of the gate voltage V135. This allows silicon controlled rectifier 68 to remain on. This sequence of operations is repeated each half cycle of alternating current from the source 42 keeping silicon controlled rectifier 68 continuously conducting. It will therefore be understood that the flow of current through the gate component of the anode-to cathode resistance R(A-K) is the means whereby the hysteresis in the operation of the overall circuit previously described is effected. The fact that capacitor 65 is connected to gate 76, allows the energy from that voltage drop, represented by V135, to be absorbed during a period of time when current conduction in silicon controlled rectifier 68 is insured by a high value of pulsating current from the source 42. This energy absorption is accomplished by the transfer of energy or charge by way of current 136I to capacitor 65. Consequently, once silicon controlled rectifier 68 has been turned on by the presence of comparator voltage V134, the aforementioned voltage boosting circuit may be used to sustain continued current conduction through silicon controlled rectifier 68 even though V134 may vary slightly in a negative direction. The net effect is to force the voltage at terminal 76 to be equal to the value of V135 so that the voltage at junction point 62 is raised by an amount equal to the difference between voltage V135 and voltage V134. Therefore rotor 14 must be rotated a significant number of degrees or radians in the clockwise direction 19CW to provide sufficient negative voltage V54 at point or junction 49A to cause voltage V134 at junction point 62 to change to a value sufficiently low to deenergize silicon controlled rectifier 68. Since it is contemplated in the first embodiment of the invention that rotor 14 and the corresponding generally rigidly attached shaft 18 are actuated to rotate significantly because of motion in an associated component of a machine tool or some similar mechanical device effecting a cam, gear or lever follower attached or secured to shaft 18, silicon controlled rectifier or switch 68 may be turned on by relatively large excursions or changes of voltage V134 while relatively small excursions or changes of voltage V134 due to vibrations in the associated machine tool or the like may not cause silicon controlled rectifier 68 to be deenergized or turned off. Such small changes of voltage V134, correspondingly, will not cause coil 82 to be deenergized. Therefore, circuit contacts 90, once closed, will remain closed to maintain electrical continuity between circuits 92 and 94 unless rotor 14 is rotated significantly in a clockwise direction 19CW.

Figure 3:
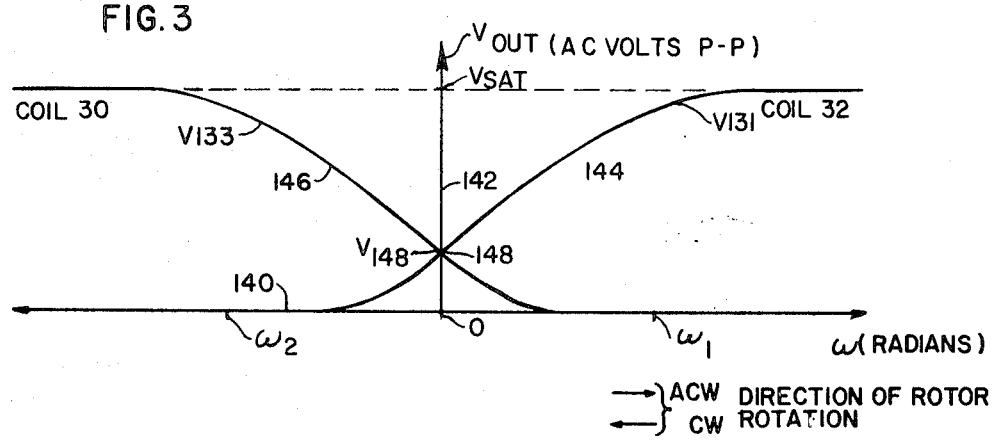
FIG. 3 is a superimposed plot or graph of transducer output voltage versus transducer rotor position.

Referring now to FIG. 3, a graph of output voltage for the coils 30 and 32 of stator 12 versus angular rotation of the rotor 14 is shown. In this plot, angular rotation in radians is indicated along abscissa 140, while output voltage and alternating current voltage peak-to-peak is indicated along ordinate 142. The output voltage of coil 30 is represented by curve 146 and the output voltage of coil 32 is represented by curve 144. It will be noted that the output voltage of coil 30 decreases from a saturation value $V_{SAT}$ as the rotor 14 is rotated in a counterclockwise direction to a value of zero output voltage, but the output voltage of coil 32 decreases from a saturation voltage $V_{SAT}$ to zero voltage as rotor 14 is rotated in a clockwise direction. As shown in FIG. 3, $\omega 1$ represents the approximate angular displacement from reference position zero or reference line 21, as shown in FIG. 1, that rotor 14 must be rotated in the counterclockwise direction for the voltage or current flowing from coil 32 to increase to the saturation voltage. As shown in FIG. 3, $\omega 2$ represents generally the same angular displacement as was described with respect to $\omega 1$ for the output voltage and current of coil 30 to increase to saturation. It will be noted that at the zero point along the abscissa 140 or generally half-way between $\omega 2$ and $\omega 1$, curve 144 and curve 146 cross or intersect which means that the output voltages of coil 32 and coil 31 are substantially equal at the zero reference point or point 21, as represented on rotor 14 shown in FIG. 1. This point or crossover is indicated at 148. It is noted that point or crossover 148 is not at zero output voltage, but at some predetermined value of voltage V148. However, the difference in voltage between coil 32 and coil 31 as a function of angular rotation of rotor 14, is substantially zero at this point. This is demonstrated more clearly in FIG. 5 which will be discussed hereinafter.

Figure 4:
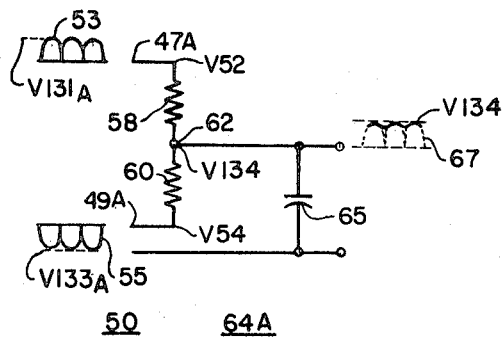
FIG. 4 is a schematic diagram of part of the comparator circuit and capacitor voltage boosting network as used in the primary embodiment of the invention.

FIG. 4 shows a schematic diagram of part of of the circuitry shown in FIG. 1. That is, the resistive part of the comparator circuit network 50 and the voltage boosting means 64A or capacitor 65. As is shown in FIG. 1, junction point 62 is the terminal where capacitor 65 is connected to the series circuit combination of resistors 58 and 60. Also, voltages V52 and V54 are indicated at points 47A and 49A, respectively. It should be noted that curve or waveform 53 represents the output voltage of bridge rectifier means 52, more specifically a positive pulsating current voltage having a maximum amplitude V131A. Pulse train 55 indicates a series of negative rectified pulses having an amplitude V133A, while curve or waveform 67 represents a filtered series of positive output pulses having an amplitude V134. This latter situation results where the magnitude of output voltage V52 is greater than that of voltage V54, the difference voltage being a voltage having the magnitude V134 and being positive in polarity. The smoothing or filtering of the voltage V134 is done by the multi-purpose capacitor 65.

Figure 5:
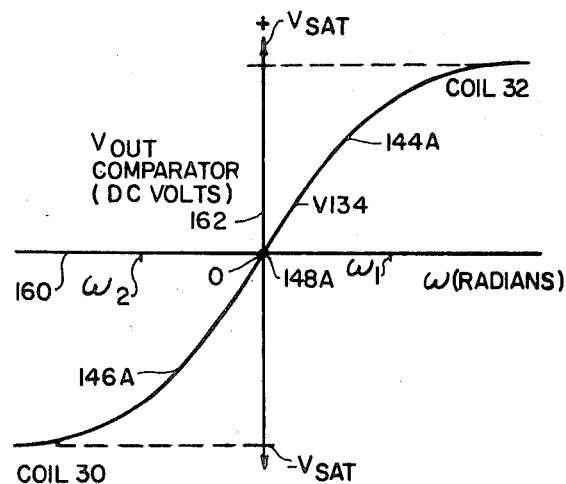
FIG. 5 is a plot of comparator output voltage versus transducer rotor position.

FIG. 5 shows graphically the output voltage of the voltage comparator 50 as a function of rotation of rotor 14. The ordinate 162 indicates the output voltage in direct current volts and the abscissa 160 indicates the rotation of the rotor in angular radians. The quantities $\omega 1$ and $\omega 2$ are the same quantities indicated as $\omega 1$ and $\omega 2$, respectively, in FIG. 4. Generally, curve 146A corresponds to curve 146 of FIG. 3 and curve 144A corresponds to curve 144 of FIG. 3. It will be noted that point 148A or the zero point in FIG. 5 corresponds to point 148 in FIG. 3. This is the point where there is substantially no net output voltage because there is no difference between the voltages generated in coil 30 and coil 32. Consequently, this indicates a value of zero volts for voltage V134 at point 62, as shown in FIG. 4, with the waveform curve 67 therefore being a generally straight horizontal line, representing zero voltage for this operating condition.

Figure 6:
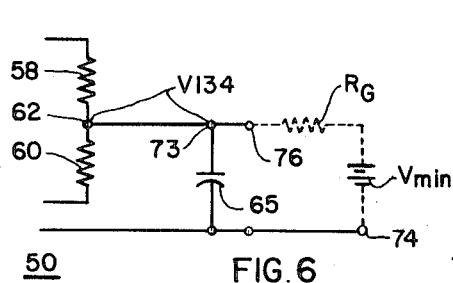
FIG. 6 is a schematic diagram similar to the schematic diagram shown in FIG. 4 with the addition of a partial equivalent circuit for a silicon controlled rectifier.

Referring now to FIG. 6, resistors 58 and 60 which were shown in FIG. 5 are shown again in FIG. 6 as is capacitor 65. Voltage V134 is indicated at junction point 62 and capacitor terminal 73 which for most purposes are substantially the same points electrically. Also connected to junction point 62 and having substantially the same voltage or potential V134 is gate terminal 76. Shown connected between gate terminal 76 and cathode terminal 74, is an intrinsic equivalent circuit for a silicon controlled rectifier or gated switching means 68. There is an equivalent resistance $R_G$ and an equivalent reverse voltage $V_{min}$. In actual operation, the voltage V134 must overcome or be greater than $V_{min}$ or the minimum firing voltage of the silicon controlled rectifier 68 in order for the silicon controlled rectifier 68 to conduct, and the current into the gate terminal 76 of silicon controlled rectifier 68 is limited by intrinsic resistance $R_G$.

Figure 7:
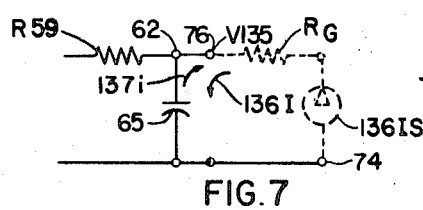
FIG. 7 is a schematic diagram similar to that shown in FIG. 6 with the addition of another possible equivalent circuit for a silicon controlled rectifier.

Referring to FIG. 7, R59 is shown as representing a Thevenin equivalent circuit for resistors 58 and 60. Junction point 62 is again shown adjacent to gate 76 Again, an equivalent circuit is shown which extends between gate terminal 76 and cathode terminal 74, and as was the case in FIG. 6, $R_G$ is shown connected to gate 76. However, a current source 136IS is shown connected in series with $R_G$. Current source 136IS, upon energization or turning on of silicon controlled rectifier 68, causes a voltage V135 to be present at gate terminal 76 and a current 136I to flow into capacitor 65. As current decreases through the main anode-to-cathode circuit (72-to-79) of silicon controlled rectifier 68, the value of current 136I as generated in source 136 IS decreases and the voltage drop V135 decreases in proportion to the current which flows through the anode-to-cathode (72-to-79) circuit of silicon controlled rectifier 68. Consequently, capacitor 65 discharges to return some of the energy in the form of current 137I into gate 76 that was originally supplied to it by current 136IS, thus maintaining gate 76 of silicon controlled rectifier 68 at a potential or voltage which is sufficient to actuate the silicon controlled rectifier 68 to continue to conduct or maintain SCR68 in a conducting state.

Figure 8:
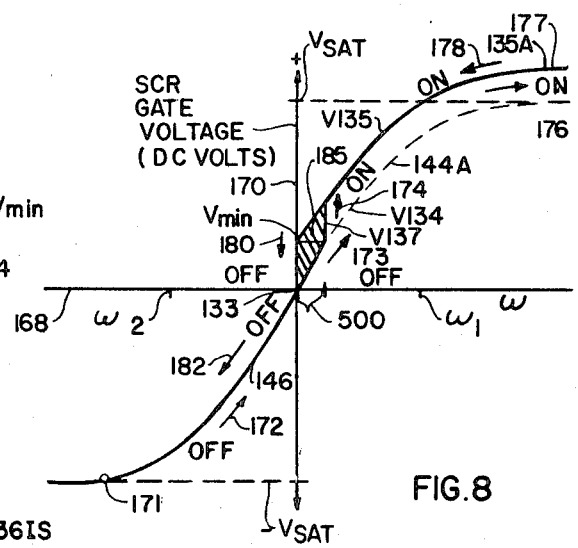
FIG. 8 is a plot of silicon controlled rectifier gate voltage versus transducer rotor position.

FIG. 8 graphically represents what was previously described with respect to FIGS. 6 and 7. FIG. 8 is similar to FIG. 5 in that ordinate 170 represents the silicon controlled rectifier gate voltage V135 and the abscissa 168 represents the angular position of the rotor 14 with respect to reference point 21. As can be seen, curves 146A and 144A are substantially the same as those shown in FIG. 5. To consider the action of the silicon controlled rectifier gate voltage V135 as the position of the rotor 14 of the transducer 10 is varied from a counterclockwise deviation or position with respect to the reference point 21 to a clockwise deviation from the reference point 21, the following operation occurs assuming that the rotor has been initially adjusted to an extreme counterclockwise position as represented by point 171 on curve 146. Since curve 146A and curve 144A in combination indicate voltage V134 as a function of the position of the rotor 14, the voltage corresponding to point 171 represents a negative saturation voltage or negative voltage at the gate 76 of the silicon controlled rectifier 68. As the rotor 14 is moved in a counterclockwise direction 19ACW as indicated by arrow 172, silicon controlled rectifier 68 remains off, until after the output voltage V134 passes zero reference point as indicated by 133 on curve 144A. However, when rotor 14 has been rotated in a counterclockwise direction 19ACW sufficiently for the voltage comparator circuit 50 to produce the value $V_{min}$ at junction 62, as indicated in FIG. 6, the silicon controlled rectifier 68 will conduct and immediately, as indicated at arrow 174 in FIG. 8, the voltage V134 at the gate 76 of the silicon controlled rectifier 68 will increase by a predetermined value so that further changes in the voltage will be along the curve 135A as shown in FIG. 8. This jump in voltage V137 represents the amount of additional voltage which must be overcome by rotating the rotor 14 in the opposite or clockwise direction 19CW and contributes to the hysteresis of the switching circuit 40. As the rotation of the rotor 14 is continued in a clockwise direction as indicated at 176, eventually an extreme clockwise position 177 is reached whereafter the rotor 14 is then moved in a clockwise direction 19CW as indicated at 178 on voltage curve 135A. Curve 135A represents the voltage V135. It will be noted that the voltage at the gate 76 will be the voltage V135 as represented by curve 135A even after the rotation of rotor 14 has passed the minimum firing voltage as indicated by $V_{min}$ on abscissa 168. Consequently, it is not until the rotor 14 has reached the zero reference point 133 or the point represented by line or indicator 21 in FIG. 1 that the silicon controlled rectifier 68 will cease to conduct or turn off as indicated at 180 in FIG. 8. At this point, continued rotation of the rotor 14 in the clockwise direction 19CW as indicated at 182 will retain the silicon controlled rectifier 68 in the off status. The excursion of the rotor 14 is completed when it returns to the starting point 171.

It will be noted that shaded region 185 represents the hysteresis operating region of the silicon controlled rectifier gate circuit 66. In other words, this means that once the silicon controlled rectifier 68 has been toward on by applying a predetermined minimum voltage value $V_{min}$ to the gate 76, a substantial clockwise rotation of the rotor 14 is required as represented by angular displacement 500 shown in FIG. 8, to cause silicon controlled rectifier 68 to turn off.

Figure 9:
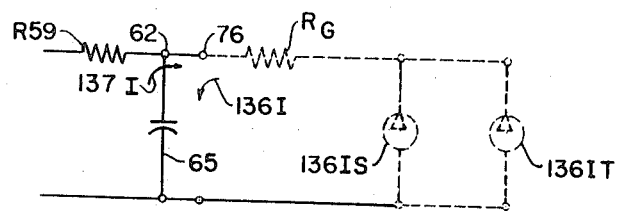
FIG. 9 is a schematic diagram similar to the schematic diagram shown in FIG. 7, with an element added for the transient response of the silicon controlled rectifier.

Referring now to FIG. 9, a circuit similar to that shown in FIG. 7 is shown with the addition of an element 136IT which represents a transient current generator. Transient current generator 136IT contributes to the total amount of current 136I which flows into capacitor 65 when silicon controlled rectifier 68 is energized and turned on.

Figure 10:
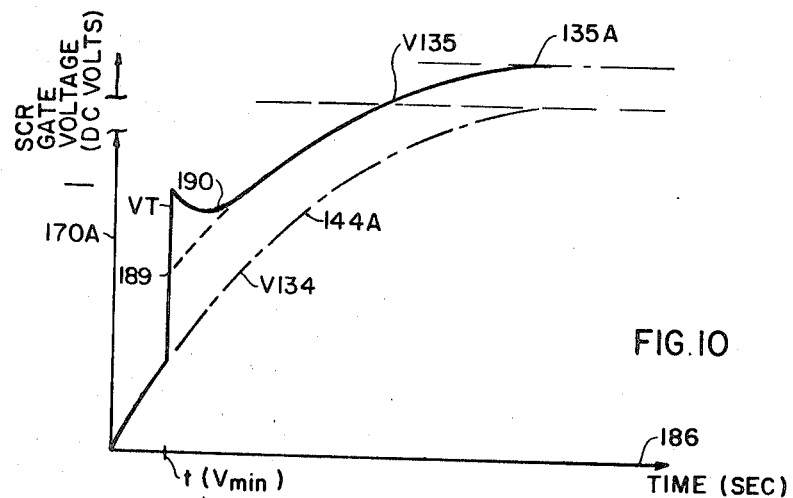
FIG. 10 is a plot of the transient response of the silicon controlled rectifier as a function of time.

Referring to FIG. 10, a voltage-versus-time plot for the silicon controlled rectifier gate 68 is shown. The voltage with respect to time follows curve V134 until time $t(V_{min})$ is reached, in which case, the silicon controlled rectifier voltage changes as indicated by a steep rising voltage pulse 189 to a maximum value VT. Then the value of voltage decreases as shown by that part of the curve 190 until plot of the voltage V135 with respect to time is reached, which corresponds to the curve 135 as shown in FIG. 8. The transient voltage VT which results at the gate terminal 76 of silicon controlled rectifier 68, is a function of transient current 136IT, and its large positive spike helps in creating a positive turn on action for silicon controlled rectifier 68. The transient voltage is dependent upon current 136IT flowing through capacitor C(G-A) as shown in FIG. 11.

Figure 11:
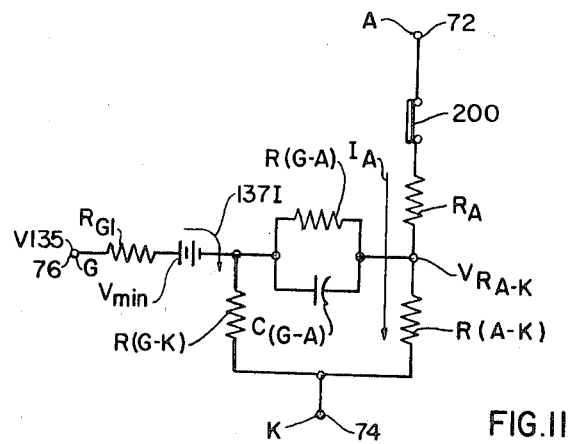
FIG. 11 is an equivalent circuit for a silicon controlled rectifier.

Referring now to FIG. 11, an equivalent circuit for silicon controlled rectifier 68 is shown including gate G, 76, anode A, 72 and cathode K, 74. This equivalent circuit comprises an anode component of resistor-to-cathode resistance $R_A$ and a gate component R(A-K). It also includes a gate-to-cathode resistive component R(G-K), a gate-to-anode resistive component R(G-A) and a gate-to-anode capacitance C(G-A) as mentioned previously. In addition, a voltage source indicated by $V_{min}$ is connected in series with $R_{G1}$ in the gate circuit. It is proposed that the anode current which flows when silicon controlled rectifier 68 is on, flows through resistive component R(A-K) and is responsible for substantially producing the voltage V135 at gate 76, where voltage V135 is a function of the current $I_A$ flowing through resistance R(A-K). When the current $I_A$ reaches a low value, V135 decreases so that current 137I as described previously, may flow into gate 76 through $R_{G1}$ and through the resistive component of the gate-to-cathode circuit R(G-K) whereupon voltage V135 is sustained until $I_A$ once again reaches a sufficiently high value to maintain the silicon controlled rectifier 68 in the on state. Equivalent relay contact 200 is closed to indicate that silicon controlled rectifier 68 is in the conducting mode.

Figure 12:
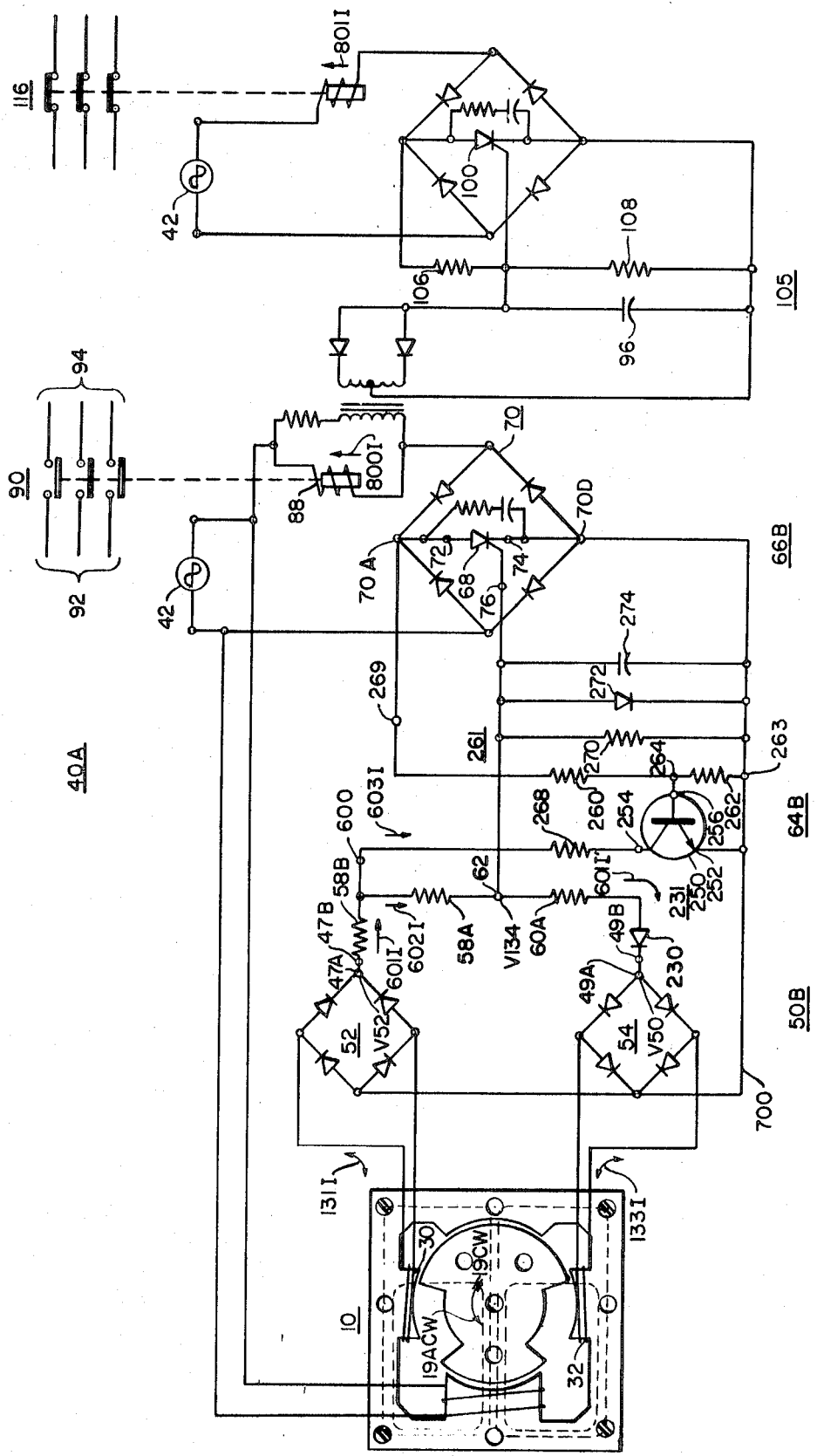
FIG. 12 is a schematic diagram of another embodiment of the invention.

FIG. 12 shows a second embodiment of the invention. The embodiment of the invention shown in FIG. 12 is generally the same as the first embodiment of the invention shown in FIG. 2 with two exceptions. First, the hysteresis function is provided by different means and second, this embodiment does not rely on the fact that the voltage of the gate 76 increases when the silicon controlled rectifier 68 is turned on. Consequently, capacitor 274 shown in FIG. 12 does not perform the same function as capacitor 65, shown in FIG. 2. Rather, capacitor 274 is merely useful in helping to trigger silicon controlled rectifier 68 into the on state. Diode 272 is used to prevent high reverse voltages from being impressed between the cathode 74 and gate 76 of the silicon controlled rectifier or thyristor 68. Resistor 270 is a ballast resistor used to absorb extra energy in the triggering network 64B of the silicon controlled rectifier 68 of static gating means 66B. Primarily, the main difference between the first embodiment of the invention and the second embodiment of the invention as shown in FIG. 12, is the use of a different hysteresis generating means 64B which differs significantly from the hysteresis generating means 64 shown in FIG. 2. For this reason, it is to be understood that the operation of the transducer 10 and the slave or complementary circuit 105 shown in FIG. 12 is the same as the operation of the corresponding circuits shown in FIG. 2. In addition, the basic operation of the switching component 68 as incorporated in switching circuit 66B which ultimately provides for the energization of coil 88 which provides for the connection of electrical circuits 92 and 94 through relay contact means 90, is essentially the same in FIG. 12 as it is in FIG. 2.

As can be seen in FIG. 12, voltage comparator means 50B is slightly different from voltage comparator means 50 as shown in FIG. 2, in that an additional resistor 58B and a diode 230 is added to the series combination of components connected between terminals 47A and 49A in FIG. 12. Resistors 58A and 58B are in combination, and generally but not necessarily, equal to the resistance value in ohms of resistor 58 previously described in connection with FIG. 2. Resistor 60A is generally the same as resistor 60 shown in FIG. 2 and diode 230 is added for temperature compensation. The particular operation of the voltage boosting network or hysteresis network 64B is as follows. Assuming that voltage V52 at junction point or terminal 47A is sufficiently low so that silicon controlled rectifier 68 is not energized because sufficient voltage has not been impressed upon gate terminal 76 to energize the controlled rectifier 68, it will be noted that substantially the entire voltage of the alternating current source of voltage 42 is impressed across terminals 70A and 70D which, in turn, are connected to resistors 260 and 262. Resistors 260 and 262 are connected in series circuit relationship, having a common terminal 264 connected to the base 256 of a semiconductor transistor 250. Since the voltage 42 across voltage divider combination 260 and 262 is relatively large, transistor 250 is turned on or saturated, causing current 603I to flow through collector load resistor 268 into the collector 254 of transistor 250 and out of the emitter 252 of transistor 250 to return conductor or line 700. Concurrently, current 602I flows through voltage divider combination 58A and 60A imposing voltage V134 at terminal 62 and, consequently, on gate 76 of silicon controlled rectifier 68. As was mentioned, the amount of current 602I flowing through resistors 58A and 60A is insufficient to create a voltage V134 which can trigger silicon controlled rectifier 68 on. Current 601I which is equal to the total of current 602I and current 603I, flows from terminal 47A. As rotor 14 is moved in a counterclockwise direction 19ACW, the voltage V52 and current 601I available at terminal 47A increase toward predetermined values and V134 increases correspondingly to the value where $V_{min}$, as shown in FIG. 6, is exceeded and silicon controlled rectifier 68 is actuated to a conducting condition. When this occurs, the voltage drop between terminals 70A and 70D decreases to substantially zero voltage or to the voltage drop across a conducting SCR 68. When that happens, the voltage at terminal 264 or base of transistor 250 decreases to a value which is insufficient to maintain transistor 250 on or which causes it to cease to conduct. Therefore, current 603I ceases to flow and since current 601I remains constant or at a predetermined value, current 602I must increase. The voltage drop through resistor 60A therefore increases and, as a consequence, the voltage V134 at terminals 62 increases even though rotor 14 must not have been turned further to a different position. This means that rotor 14 must be rotated in the opposite direction or clockwise direction 19CW a significant amount to cause current 701I and consequently, current 602 I to decrease to such a value that V134 at junction point 62 will decrease below the minimum firing voltage $V_{min}$ of silicon controlled rectifier 68. If this happens, of course, silicon controlled rectifier 68 will cease to conduct and substantially the full magnitude of voltage source 42 will be impressed across the series circuit which includes resistors 260 and 262 thus turning transistor 250 on and providing a path for current 603I to flow, whereupon the operating cycle of the overall circuit has been completed.

It is to be understood that the transducer or switching device 10 may have a stator 12 which is not necessarily a laminated stator. The laminations such as 12A and 12B are added to prevent circulating eddy currents and associated heating and any magnetic material which may be used to prevent or reduce eddy currents without being laminated is suitable for use in transducer section 12. It is also to be understood that pole windings 28, 30 and 32 may be wound in various configurations upon the associated poles of stator 12. It is also to be understood that the direction of rotation of rotor 14 may be changed from counterclockwise to clockwise for any particular switching function depending upon the way in which the coils 28, 30 and 32 are wound on poles 20, 22 and 24 respectively, and the way that the coil leads are connected to the bridge circuits 52 and 54, for example. It is also to be understood that the circuitry to be controlled by switch 68 or switching section 66 may be single-phase or multiphase and additionally is not limited to either of these alternatives. The same applies for the slave or complementary circuit 105. In general it is to be understood that both the main switching circuit as indicated at 66 and the slave or complementary circuit 105 may be of the same basic type as disclosed with certain variations. However, any alternative complementary circuit which may be coupled in some working manner to the electrical pulses of the main switching circuit 66 may be used. In addition, circuit 105 which heretofore has been called a complementary or slaved oppositely phased switching circuit, may act in tandem or in parallel with the main switching circuit 66; that is, switching circuit 105 and switching circuit 66 may both cause external circuits to open and close simultaneously rather than to operate differently at a particular time as disclosed. It is also to be understood that the switching elements 68 and 100 are not necessarily limited to the silicon controlled rectifier type of switching element as disclosed. They may include any type of solid state switching device which approximates the properties previously discussed. It is also to be understood that limit switch 40 may omit the extra switching section 105 or corresponding transformer 85 in a particular application. That is, switch 40 may merely comprise a single switching section 66. It is also to be understood that the surface 15B of rotor 14 is preferably larger than the surface 26C of pole 26 in order that the magnetic flux flowing in the air gap between surface 26C and 15B during operation of the transducer or switching device 10, will not be forced to flow through a magnetic circuit which varies substantially in reluctance as rotor 14 is turned. It is also to be understood that the curves and equivalent circuits shown in FIGS. 3 through 11 represent proposed theories to assist in understanding the operation of the switching circuit 40 and that the practice of the applicants' invention as disclosed does not depend upon the substantiation of any or all of the theories proposed and equivalent circuits derived with respect to the curves and equivalent circuits discussed. It is also to be understood that the alternating current voltage source 42 need not necessarily be a source of sinusoidally shaped alternating current but may be any source of alternating or pulsating current regardless of the shape. It is also to be understood that resistors 268, 260 and 262 may not be necessary to insure the operation of the hysteresis generator or circuit 64B as shown in FIG. 12, but rather that some or all of said resistors 268, 260 and 262 may be omitted depending upon other circuit conditions in circuit 40A. Also, it is to be understood that although this invention may be used in the control of a machine tool, it is not limited to such applications and may be used in any application where a limit of some operation or movement is to be sensed and a corresponding output or response results when this limit is reached.

The apparatus embodying the teachings of this invention has several advantages. For example, the hysteresis means disclosed is such that mechanical vibration in the transducer section 10, extraneous noise pickup by components of the switch or aging or slight variation in the values of the components of the switch, will not cause a once triggered switch to deenergize when, in fact, a predicted happening or event which is to cause the denergization has not occurred. Another advantage is the fact that intrinsic capacitance and resistance of a silicon controlled rectifier may be utilized to actuate a more positive turning on of the switching circuit by proper selection of the external adjacent components connected to the silicon controlled rectifier gate. Still another advantage is the fact that the total area through which magnetic flux must flow in the transducer or mechanical switch, may remain substantially unchanged during the operation of the transducer. Another advantage is the fact that the transducer or switching device is more sensitive to slight angular changes in rotor position so that the angular positions of the rotor which determine turn on and turn off of the associated switching means can be predetermined with greater accuracy. Finally, the transducer has the advantage of not acting as merely a variable reluctance transducer, but actually produces an output current which may be controlled by the operation of the transducer. Another advantage is that because the magnetic circuit is essentially a closed loop the magnetizing current is low and hence the input impedance is high. Therefore, the limit switch can be energized from voltage sources of different values with virtually no need to use an electrical current limiting resistor.

We claim as our invention:

1. Electrical apparatus comprising a gated static switching means adapted to control electrical current flowing through a load, a voltage boosting means connected to the gate of said static switching means to be electrically charged periodically when said gated static switching means is on, said voltage boosting means being operative to periodically release said electrical charge to said gate of said gated static switching means to keep said gated static switching means on during predetermined operating conditions, a generally stationary magnetic structure and a generally movable adjacent magnetic member cooperating therewith, said stationary magnetic structure and said movable magnetic member comprising a path for magnetic flux, said stationary structure having disposed thereon first, second and third inductive coils, said third inductive coil being connected to a source of alternating current and disposed to produce magnetic flux in said stationary structure and said movable member when energized from said source of alternating current, said magnetic flux having three component paths of flow, a first component path comprising a first portion of said movable member and that portion only of said stationary structure upon which said first coil is disposed, a second component path including a second portion of said movable member and that portion only of said stationary structure upon which said second coil is disposed and a third component path including a third portion of said movable member and excluding any portion of said stationary structure upon which either said first or second coil is disposed, the amount of magnetic flux in said first and said second component oaths being generally variable in inverse relationship to each other regardless of the position of said movable member with respect to said stationary member within a limited range, the total amount of said magnetic flux in said first and said second component paths being significantly less than the amount of said magnetic flux in said third component path at any time, said movable member being disposed with respect to said first and said second component paths in such a manner that a small change in the position of said movable member provides a relatively large change in the amount of said flux in said first and said second component paths, the total magnetic flux in said first, said second and said third component paths remaining generally unchanged regardless of the position of said movable member with respect to said stationary member, a voltage comparator means electrically connected at its input to said first and said second coils and at its output to said gate, said first and second inductive coils having induced therein in response to said magnetic flux flowing therethrough first and second alternating electrical currents respectively, said first and second alternating currents being applied to said voltage comparator means at said input to produce a unidirectional current voltage at said output to energize said gate, said movable member being actuable to control the magnitude and polarity of said unidirectional current voltage at said output, said voltage boosting means being connected to maintain said unidirectional current voltage at said gate after said gate is energized during limited relative motion between said stationary member and said movable member.

2. Electrical apparatus as claimed in claim 1 wherein said first, second and third inductive coils are all wound on said stationary magnetic structure.

3. Electrical apparatus as claimed in claim 2 wherein said stationary magnetic structure comprises first, second and third poles, said first and said second poles being oppositely disposed, said third inductive coil being wound on said third pole, said first and second inductive coils being wound on first and second poles, respectively, to control said unidirectional current voltage which is produced by said voltage comparator means to be either negative or positive and to be substantially proportional to the relative position of said movable magnetic member with respect to said stationary magnetic member over a limited range of movement of said movable magnetic member.

4. Electrical apparatus as claimed in claim 3 wherein said stationary magnetic member comprises a fourth pole, said stationary magnetic member being shaped to conduct magnetic flux in closed paths from said third pole through said movable magnetic member to said first, second and fourth poles, and back to said third pole through said stationary magnetic structure.

5. Electrical apparatus as claimed in claim 4 wherein said movable magnetic member comprises a rotor, said rotor being pivotally supported adjacent to said stationary magnetic structure so that it may rotate, said rotation being such that a substantial portion of said magnetic flux flows through said rotor, said main portion of said magnetic flux being conducted through said rotor to said fourth pole of said stationary magnetic member and back to said third pole in closed paths, lesser portions of said flux being conducted through said first and second poles of said stationary member and back to said third pole of said stationary member in closed paths, said rotor being actuable in either clockwise or counterclockwise directions, the relative amounts of said magnetic flux passing through said first and second poles being dependent on the angular position of said rotor, said rotor having a reference position with respect to said stationary structure whereby said flux flowing through said first and second poles is substantially equal when said rotor is disposed in said reference position to thereby apply substantially equal and opposite first and second alternating currents to said voltage comparator with substantially no voltage being applied to said gate, said first and second inductive coils being wound in predetermined directions so that said first and second alternating currents generally flow in opposite directions with respect to each other.

6. Electrical apparatus as claimed in claim 5, said gated solid state switching means comprising a silicon controlled rectifier having intrinsic cathode resistance, anode, cathode and gate terminals, said anode and cathode being adapted to be connected to a source of unidirectional current voltage.

7. Electrical apparatus as claimed in claim 6 wherein said unidirectional source of voltage comprises means for providing a pulsating rectified alternating voltage, the period of time that said silicon controlled rectifier is maintained on after said rectified alternating voltage has decreased to a value less than said minimum gate control voltage being longer than the time required for said rectified alternating voltage to increase to a value sufficient to maintain said silicon controlled rectifier in the on state, to thereby maintain said silicon controlled rectifier on continuously to conduct said rectified alternating current through said load substantially continuously.

8. Electrical apparatus as claimed in claim 6, wherein said voltage boosting means comprises a load circuit, a static device with first and second load terminals and a control terminal; a voltage feedback means, with first and second input terminals and an output terminal, said voltage comparator including a first and second current rectifying means and voltage divider means comprising first and second input terminals and first and second output terminals, said first rectifying means being adapted to rectify said first alternating electrical current from said first inductive coil to produce a first unidirectional rectified current, said second rectifying means being adapted to rectify said second alternating electrical current from said second inductive coil to produce a second unidirectional rectified current, said first input terminal of said voltage divider means being connected to said first rectifying means, said second input terminal of said voltage divider means being connected to said second rectifying means, one of said rectifying means supplying unidirectional electrical current to said voltage divider means, the other of said rectifying means absorbing substantially the same electrical current from said voltage divider means, said load circuit being connected between said first output terminals of said voltage dividing means and said first load terminal of said static device, said second load terminal of said static device being connected to both of said rectifying means, said second output terminal of said voltage divider means being electrically connected to said gate of said silicon controlled rectifier, said anode of said silicon controlled rectifier being connected electrically to said first input terminal of said voltage feedback means, said second input terminal of said voltage feedback means being connected to both of said current rectifying means, said output terminal of said voltage feedback means being connected electrically to said control terminal of said static device, said rotor being actuable to a position with respect to said reference position which causes sufficient first and second said rectified output currents to flow through said voltage divider means to produce said minimum gate control voltage at said second output terminals of said voltage divider means, and to actuate said silicon controlled rectifier to be turned on so as to cause said load current to flow through said load, said static device being turned off by the change in voltage at the anode terminal of said silicon controlled rectifier, said change in voltage being transferred through said voltage feedback means to said control terminal of said static device to turn the said static device off and increase the voltage at said second output terminal of said voltage divider means, to thereby maintain said gate voltage at a higher value than would otherwise result when said silicon controlled rectifier is conducting, a greater rotation of said rotor being required in the opposite direction with respect to said reference position to actuate said silicon controlled rectifier to substantially cease to conduct.

9. Electrical apparatus as claimed in claim 8 wherein said load circuit comprises a resistor, said static device comprises a transistor, said first load terminal comprises the collector of said transistor, said second load terminal comprises the emitter of said transistor, said control terminal comprises the base of said transistor, said voltage feedback means comprises first and second resistors connected in series circuit relationship and said output terminal forms a junction point between said first and second resistors, said voltage divider means comprising third, fourth and fifth resistors, and a diode, with said third resistor being connected between said first input terminal and said first output terminal of said voltage divider means, said fourth resistor being connected between said first output terminal and said second output terminal of said voltage divider, said fifth resistor being connected in series circuit relationship with said diode between said second output terminal and said second input terminal of said voltage divider means, said diode being connected to pass current in the forward direction from said second output terminal to said second input terminal of said voltage divider means, said first rectifying means operating as a source of electrical current and causing said first voltage divider means input terminal to be relatively positive in potential and said second input terminal of said voltage divider means to be relatively negative in potential, and said second rectifying means operating generally as a means for receiving said electrical current.

10. Electrical apparatus as claimed in claim 9 wherein said electrical apparatus additionally includes a machine tool disposed to change the rotary position of said rotor as a result of the operation of said machine tool causing said silicon controlled rectifier to switch on or off to control an operating function of said machine tool.

11. The combination as claimed in claim 9 wherein an auxiliary transformer and auxiliary switching circuit are provided, said auxiliary switching circuits being electromagnetically linked through said transformer windings to said silicon controlled rectifier, said auxiliary switching circuit being energized when substantial electrical current flows in said load circuit and said auxiliary transformer.

12. The combination as claimed in claim 10, said auxiliary switching circuit being deenergized when substantial electrical current flows in said load circuit.

13. Electrical apparatus comprising a silicon controlled rectifier having an anode, a cathode and a gate terminal and intrinsic cathode resistance said silicon controlled rectifier being connected at its anode and cathode in electrical circuit relationship with a load so that electrical load current may flow through said load and said anode-to-cathode circuit of said silicon controlled rectifier when said silicon controlled rectifier is in the on state, said anode-to-cathode circuit of said silicon controlled rectifier being empowered by a source of unidirectional voltage disposed in series circuit relationship therewith and with said load, a stationary magnetic structure, a rotor pivotally supported adjacent to said stationary magnetic structure, and being magnetically conductive, said stationary magnetic structure having first, second, third and fourth poles, said first and said second poles being oppositely disposed, said first and said second poles having wound thereon first and second electrically conducting inductive coils, respectively, said third pole having wound thereon a third inductive coil which is electrically connected to a source of alternating current, said alternating current when flowing through said third coil producing magnetic flux in said stationary magnetic structure and said rotor, the main portion of said magnetic flux flowing from said third pole through said stationary magnetic structure through said fourth pole and said rotor to return to said third pole, lesser portions of said magnetic flux flowing from said third pole through said stationary magnetic structure through said first and second poles, in parallel paths, through said rotor and back to said third pole, said rotor having a reference position relative to said stationary magnetic structure at which position generally equal amounts of magnetic flux flow through said first and said second poles, said rotor being rotatable about said pivot from said reference position in either a clockwise or a counterclockwise direction to change the amount of flux flowing through said first and said second poles, a voltage comparator with input and output terminals, said first and said second inductive coils being electrically connected in polarity opposing circuit relationship with the input terminal of said voltage comparator, the output terminal of said voltage comparator being connected in electrical circuit relationship with said gate of said silicon controlled rectifier, alternating electrical current flowing in said first and said second inductive coils in relationship to the angular displacement of said rotor from said reference position, said alternating electrical currents being compared by said voltage comparator to provide a unidirectional current voltage, the magnitude and polarity of which are proportional to the relative angular displacement of said rotor from said reference position over a limited range, substantially no unidirectional current voltage being produced by said voltage comparator when said rotor is disposed in said reference position, a predetermined value of said unidirectional current voltage causing said silicon controlled rectifier to be turned on thus causing unidirectional current to flow in said load, a voltage boosting means connected in electrical circuit relationship with said gate, said voltage boosting means being periodically electrically charged when said silicon controlled rectifier is on, said voltage boosting means periodically releasing said electrical charge to said gate to maintain said silicon controlled rectifier in the on state when said rotor is moved in such a direction as to turn said silicon controlled rectifier off by changing the value of the unidirectional current voltage on said gate, said rotor being moved an incremental distance in said same direction to thereby turn said silicon controlled rectifier off thus creating hysteresis in the switching operation of said silicon controlled rectifier.

14. Electrical apparatus as claimed in claim 13, wherein said voltage boosting means includes a capacitive element connected in circuit relation with said intrinsic cathode resistance of said silicon controlled rectifier and said voltage comparator of said variable source of voltage, said intrinsic cathode resistance being electrically connected to said capacitive element and said voltage comparator through said gate terminal, said capacitive element being electrically charged to provide an increase in voltage at said gate terminal when said silicon controlled rectifier is turned on by the action of said variable source of voltage, said increase in said gate terminal voltage being due to flow of said load current, said increase in said gate terminal voltage causing charge to flow into said capacitive element to be stored, said capacitive element being connected to later discharge a portion of said stored charge to said gate terminal and through said intrinsic cathode resistance to maintain said gate voltage at a sufficient value to actuate said silicon controlled rectifier to remain on for a predetermined period of time after said unidirectional source of voltage has decreased to a value less than said minimum gate control voltage.

15. Electrical inductive apparatus comprising a generally stationary magnetic structure and a generally movable adjacent magnetic member cooperating therewith, said stationary magnetic structure and said movable magnetic member comprising a path for magnetic flux, said stationary structure having disposed thereon first, second and third inductive coils, said third inductive coil being connected in circuit relationship to a source of alternating current and being disposed to produce magnetic flux in said stationary magnetic structure and said movable magnetic member when energized from said source of alternating current, said magnetic flux having three component paths of flow, a first component path including a first portion of said movable member and that portion only of said stationary structure upon which said first coil is disposed, a second component path including a second portion of said movable member and that portion only of said stationary structure upon which said second coil is disposed, and a third component path including a third portion of said movable member and excluding any portion of said stationary structure upon which either said first or said second coil is disposed, the amount of magnetic flux in said first and said second component paths being generally variable in inverse relationship to each other regardless of the position of said movable member with respect to said stationary member at any time, the total amount of said magnetic flux in said first and said second component paths being significantly less than the amount of said magnetic flux in said third component path at any time, said movable member being disposed with respect to said first and said second component paths in such a manner that a small change in the relative position of said movable member provides a relatively large change in the amount of said flux in said first and said second component paths, the total magnetic flux in said first, said second and said third component paths remaining generally unchanged regardless of the position of said movable member with respect to said stationary member, a plurality of electrical loads said first and said second inductive coils being disposed to produce in response to said magnetic flux first and second alternating electrical currents in said first and second coils respectively when said first and said second coils are connected in circuit relationship to at least one of said electrical loads.

16. The combination as claimed in claim 15 wherein said first, second and third inductive coils are all wound on said stationary magnetic structure.

17. The combination as claimed in claim 16 wherein said stationary magnetic structure includes first, second and third poles, and said plurality of loads includes first and second electrical loads, said first and second poles being oppositely disposed, said third inductive coil being wound on said third pole, said first and second inductive coils being wound on said first and second poles, respectively, so that said first and said second currents in said first and second coils and said first and second loads are substantially proportional to the relative position of said movable magnetic member with respect to said stationary magnetic member over a limited range of movement of said movable magnetic member.

18. The combination as claimed in claim 17 wherein said stationary magnetic member includes a fourth pole, said stationary magnetic member being shaped to conduct magnetic flux in closed paths from said third pole through said movable magnetic member to said first, second and fourth poles, and back to said third pole through said stationary magnetic structure.

19. The combination as claimed in claim 18 wherein said movable magnetic member comprises a rotor, said rotor being pivotally supported adjacent to said stationary magnetic structure so that it may rotate, said rotation being such that a substantial portion of said magnetic flux flows through said rotor, said main portion of said magnetic flux being conducted through said rotor to said fourth pole of said stationary magnetic member and back to said third pole in closed paths, lesser portions of said flux being conducted through said first and second poles of said stationary member and back to said third pole of said stationary member in closed paths, said rotor being actuable in either clockwise or counterclockwise directions, the relative amounts of said magnetic flux passing through said first and second poles being generally dependent upon the angular position of said rotor, said rotor having a reference position with respect to said stationary structure whereby the said flux flowing through said first and second poles is substantially equal when said rotor is disposed in said reference position to thereby apply substantially equal and opposite first and second alternating currents to said first and second electrical loads, said first and second inductive coils being wound in predetermined directions so that said first and second alternating currents flow in opposite directions.

20. The combination as claimed in claim 19 wherein said first and second electrical loads comprise corresponding parts of an electrical voltage comparator network, said voltage comparator having an indicating terminal adaptable for external connection, the voltage potential at said indicating terminal being generally proportional to the angular position of said rotor with respect to said reference.

21. The combination as claimed in claim 19 wherein said electrical apparatus comprises a switch.

22. Electrical inductive apparatus comprising an electrical voltage comparator network, said voltage comparator network having input terminals and an output terminal adapted for external connection, a stationary magnetic structure, a rotor pivotally disposed adjacent to said magnetic structure, said rotor being magnetically conductive, said stationary magnetic structure having first, second, third and fourth poles disposed thereon, said first and second poles being oppositely disposed, said first and second poles having wound thereon first and second electrically conducting inductive coils, said third pole having wound thereon a third inductive coil which is electrically connected in circuit relationship to a source of alternating current, said alternating current flowing through said third coil producing magnetic flux in said stationary magnetic structure and said rotor, the remaining portion of said magnetic flux flowing from said third pole through said stationary magnetic structure, through said fourth pole and said rotor to return to said third pole, lesser portions of said magnetic flux flowing from said third pole through said stationary magnetic structure through said first and said second poles in parallel paths through said rotor and back to said third pole, said rotor having a reference position relative to said stationary magnetic structure at which position generally equal amounts of said magnetic flux flow in said first and said second poles because of the disposition of said rotor, said rotor being pivotally rotatable about said pivot from said reference position in either a clockwise or counterclockwise direction to change the amount of flux flowing through said first and said second poles, said first and said second inductive coils being electrically connected in polarity opposing electrical circuit relationship to the input terminals of said voltage comparator network, alternating current flowing in said first and said second inductive coils in relationship to the angular displacement of said rotor with respect to said reference position, said output terminal of said voltage comparator network having a voltage potential thereat which is generally related to the angular position of said rotor with respect to said reference position.

23. The combination as claimed in claim 22 wherein said electrical apparatus comprises a switch.

* * * * *